(12) United States Patent
Blackburn et al.

(10) Patent No.: US 9,128,343 B2
(45) Date of Patent: Sep. 8, 2015

(54) METHOD OF MAKING AN OPTICAL ELEMENT HAVING AN ELECTROCHROMIC APODIZED APERTURE

(75) Inventors: Forrest R. Blackburn, Monroeville, PA (US); Jonathan Bork, Hudson, OH (US); John A. Charny, Richmond Heights, OH (US); Stefan C. Dehaseth, University Heights, OH (US); Peter C. Foller, Richmond, CA (US); Andrew J. Lamb, Seven Hills, OH (US); Kevin W. Seybert, Pittsburgh, PA (US); Michael A. Steimle, Chesterland, OH (US); Robert H. Tang, Murrysville, PA (US); Robert W. Walters, Export, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 287 days.

(21) Appl. No.: 13/587,284

(22) Filed: Aug. 16, 2012

(65) Prior Publication Data

US 2013/0206323 A1 Aug. 15, 2013

Related U.S. Application Data

(60) Provisional application No. 61/525,382, filed on Aug. 19, 2011.

(51) Int. Cl.
| | |
|---|---|
| *G02F 1/00* | (2006.01) |
| *G02F 1/153* | (2006.01) |
| *G02B 5/00* | (2006.01) |
| *G03B 9/02* | (2006.01) |
| *G02B 27/58* | (2006.01) |
| *B29D 11/00* | (2006.01) |

(52) U.S. Cl.
CPC ............ *G02F 1/153* (2013.01); *B29D 11/0074* (2013.01); *G02B 5/005* (2013.01); *G02B 27/58* (2013.01); *G03B 9/02* (2013.01)

(58) Field of Classification Search
CPC .... B29D 11/00; B29D 11/0074; G02B 1/002; G02B 27/58; G02F 1/153; G03B 9/02; B02B 5/005
USPC .............................. 29/530; 359/265, 267, 275
See application file for complete search history.

(56) References Cited

U.S. PATENT DOCUMENTS

| | | | | |
|---|---|---|---|---|
| 5,676,721 | A | * 10/1997 | Fredholm et al. | .................. 65/68 |
| 8,345,345 | B2 | * 1/2013 | Veenman et al. | .............. 359/273 |

(Continued)

FOREIGN PATENT DOCUMENTS

| | | |
|---|---|---|
| JO | 2003315838 | 11/2003 |
| JP | 2004145058 | 5/2004 |

(Continued)

*Primary Examiner* — David Bryant
*Assistant Examiner* — Lee A Holly
(74) *Attorney, Agent, or Firm* — The Webb Law Firm

(57) ABSTRACT

A method of forming an optical element which includes an electrochromic apodized aperture having variable light transmittance through a clear aperture area in response to an applied electrical current is disclosed. The apodized aperture includes a body including an area defining the clear aperture area wherein a fluid containment area substantially overlapping the clear aperture area, and includes at least one fill passage extending from the fluid containment area to at least one fill port outside of the clear aperture area; an electrochromic fluid within the fluid containment area substantially overlapping the clear aperture area and having variable light transmittance in response to an applied electrical current; a cover attached with the electrochromic fluid between the cover and body; electrical contacts electrically coupled to the electrochromic fluid for supplying electrical current thereto; and at least one passage seal in each said fill passage positioned outside of the clear aperture area.

17 Claims, 6 Drawing Sheets

(56) References Cited

U.S. PATENT DOCUMENTS

2003/0182964 A1* 10/2003 Fukuyama et al. .......... 65/29.11
2010/0134866 A1* 6/2010 Foller et al. ................... 359/275

FOREIGN PATENT DOCUMENTS

| JP | 2007248604 | 9/2007 |
| JP | 2009116258 | 5/2009 |

* cited by examiner

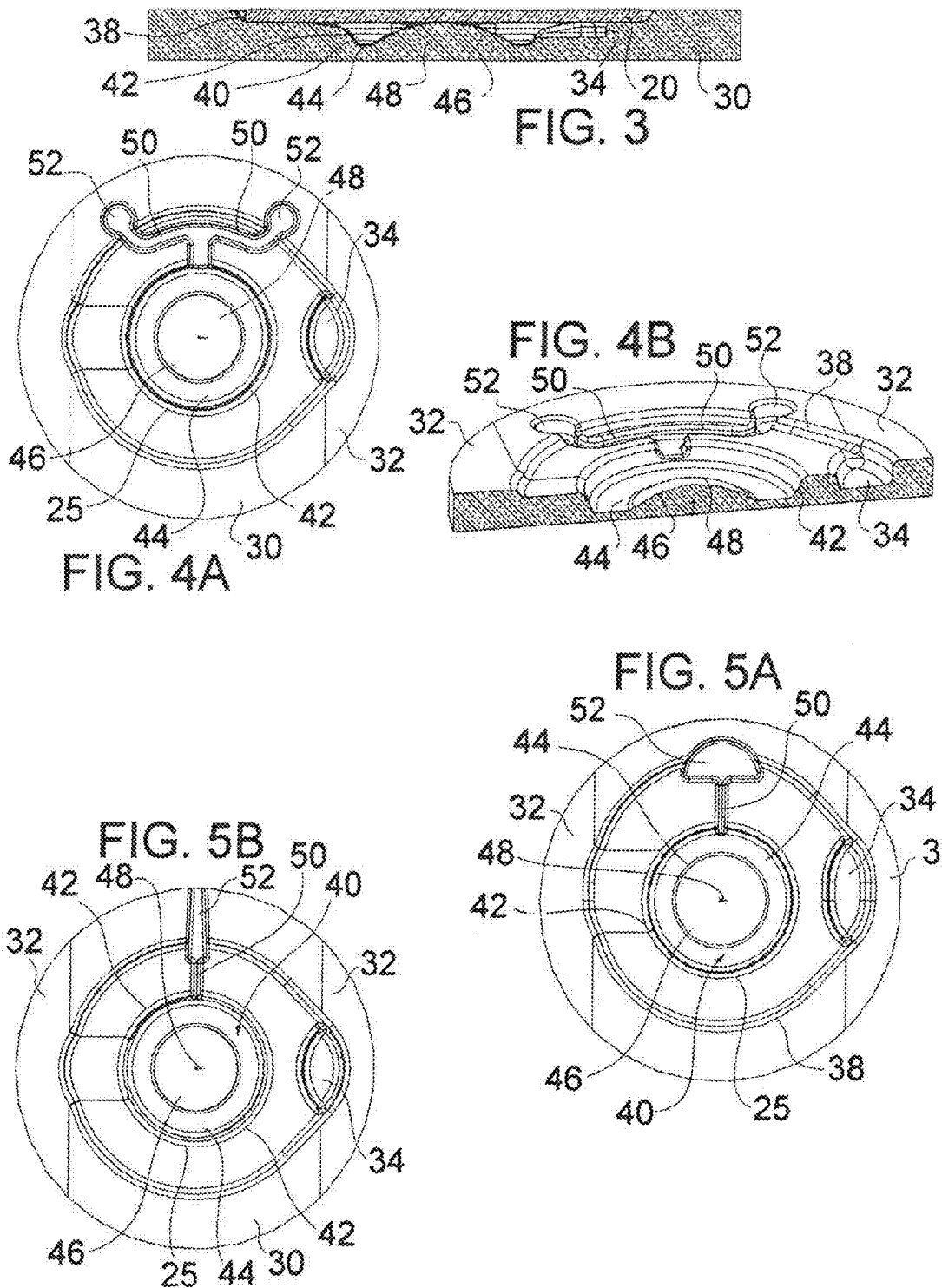

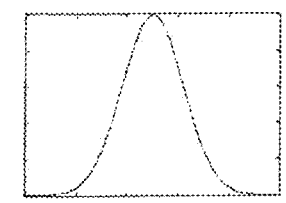
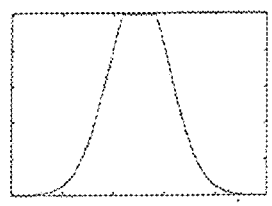
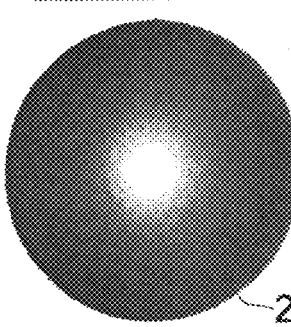
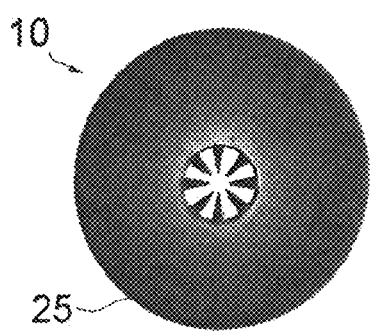
FIG. 11A  FIG. 11B  FIG. 11C
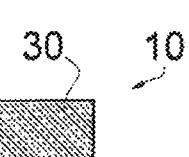
FIG. 12A
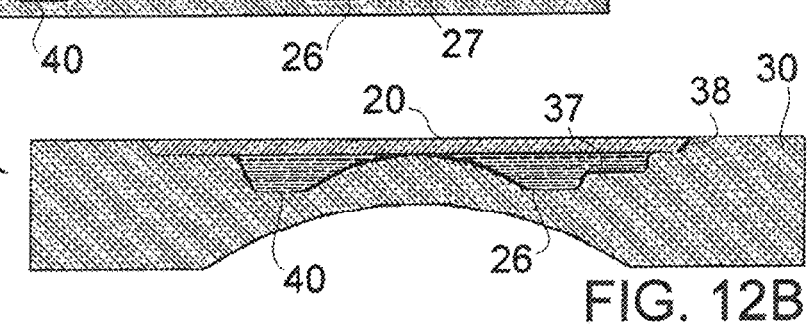
FIG. 12B
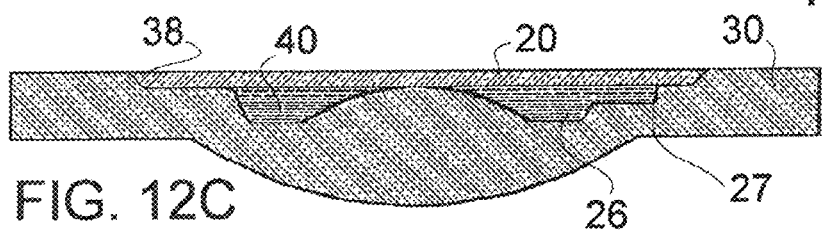
FIG. 12C
FIG. 12D

METHOD OF MAKING AN OPTICAL ELEMENT HAVING AN ELECTROCHROMIC APODIZED APERTURE

CROSS-REFERENCE TO RELATED APPLICATIONS

The present application claims priority of U.S. Provisional Patent Application Ser. No. 61/525,382 entitled "Optical Element Having an Electrochromic Apodized Aperture, an Aperture Body Forming an Apodized Aperture and Method of Making Same" filed Aug. 19 2011, which is incorporated by reference herein in its entirety.

DESCRIPTION OF THE INVENTION

The present invention relates to methods of making optical elements incorporating an electrochromic apodized aperture. Since essentially the advent of photography, adjustable camera settings have been critical in obtaining correctly exposed pictures. These adjustments include "shutter speed" which relates to the adjustable exposure time of the "film", "film speed" which related to a choice of "film sensitivity", and lens aperture which relates to an adjustable diaphragm in the lens. In addition to, affecting the film exposure, these adjustments also provide other essential benefits. For example, the shutter speed adjustment allows the photographer to freeze in time a fast moving scene. The film speed allows the photographer to get the desired grain in the image. The lens aperture adjustment allows the photographer to get the desired depth of field.

In digital cameras, the electronic shutter control (which relates to the adjustable integration time of the image sensor) often replaces the mechanical shutter but does not eliminate the need for the lens aperture adjustment. Even in digital cameras the lens aperture adjustment remains an indispensable tool to photographers, not only to control the amount of light impinging on the imaging sensor but also to achieve the desired depth of field.

Currently, the most common form of lens aperture adjustment is the mechanical is diaphragm or mechanical "iris". The conventional mechanical iris consists of multiple blades, which can be moved with respect to each other so as to form a pseudo-circular adjustably sized polygonal aperture. The blades are often attached to an inner ring and to an outer ring that are moved relative to each other to adjust the opening size of the mechanical iris.

Most film cameras and many digital cameras incorporate a mechanical iris or some other form of lens aperture adjustment, e.g., a rudimentary aperture wheel. There are some notable exceptions to this general rule: such as disposable film cameras, very-low-cost digital cameras and the camera unit found in most cell phones camera modules. The main reason for not using a lens aperture adjustment in these areas is the cost of incorporating such a dynamic component. In addition to the prohibitive price there can he durability issues associated with mechanical iris designs. Durability of components is critical in cell phone applications. Thus almost all cell phone cameras modules do not include a lens aperture adjustment Cell phone cameras modules were not originally designed as replacements for traditional cameras. Cell phone camera modules were generally supposed to produce acceptable images in dim light conditions without a flash. For this reason, cell phone cameras modules have generally been fitted with lenses with a large fixed aperture, e.g., f/2.8, to maximize sensitivity at the expense of the depth of field. Cell phone cameras modules have typically relied on the electronic shutter to adjust the exposure level. Consequently, most existing cell phone camera modules produce questionable quality images at low-light level due to objectionable shot noise and readout noise; and at high-light level due to poor depth of field, such cell phone modules also typically produce images with reduced sharpness due to lens aberrations and over exposure.

However, due to the enormous popularity of cell phones with cell phone camera modules which are already outselling film and digital cameras, cell phone camera modules are now poised to effectively replace traditional cameras.

Cell phone camera modules need to approach or match traditional camera image quality at a fraction of the cost of a traditional camera. This issue is further aggravated by price pressure and market demand for a larger number of pixels. As semiconductor technology progresses, image sensors get more sophisticated and pixels get smaller thus requiring a lens with a wider aperture in order to maintain the same sensitivity. This requirement conflicts with the need for a sharper lens, since a wider aperture results in greater lens aberrations, and for an increased depth of field, since a wider aperture results in a reduced depth of field.

Some possible solutions for improved cell phone camera modules are the optical auto-focus using a voice coil or a "liquid lens" and the "phase-mask" approach using image processing algorithms. A voice coil auto-focus adjustment type system is a mechanical solution that increases costs and component complexity in operation. In the case of the optical auto-focus using a liquid lens, the depth of field is not increased. Rather, the focus simply is adjusted for a particular distance. In the case of the phase-mask approach, the focus of the lens is, in fact, degraded. A phase-mask, which is placed on one of the lens elements, introduces a relatively constant amount of defocus throughout an extended depth of field. The sharpness is then partially restored digitally by using image processing algorithms. Unfortunately, the sharpness restoration algorithms also introduce a significant amount of noise in the image. It is clear that none of these solutions really eliminate the need for an adjustable lens aperture but there are no suitable technical implementations fulfilling this need. Current mechanical irises can be too expensive, too bulky, too fragile, or require too much power to satisfy the expected one-billion cell phone camera module market. Further, current mechanical irises also can have the disadvantage of diffraction through their circular aperture which significantly degrades the image sharpness for small aperture settings, e.g., high f numbers such as f/5.6 or higher, particularly as the pixel density, number of pixels per square mm, continues to increase.

There have been several proposals in the patent literature that attempt to address these deficiencies, as well as general background patents addressing other aperture applications. A selection of these patents is discussed below.

U.S. Pat. No. 7,585,122, which is incorporated herein by reference, discloses an electro-mechanical adjustable aperture camera for cell phone camera modules, and the like, that is formed of at least two electrodes, and an electrical circuit for applying a voltage to the electrodes in order to create an electric field between the electrodes. In addition, the construction comprises a center unit with a hole in the middle as an aperture, where the center unit is made of an electro-active material and placed essentially between the electrodes. The center unit is then deformed, expanded or retracted by applying the electric field between the electrodes using the electrical circuit thereby adjusting the aperture in the center unit.

U.S. Pat. No. 7,929,220, which is incorporated herein by reference, discloses an adjustable apodized lens aperture constructed using photochromic material. As the excitation energy increases, the aperture constricts so as reduce the amount of light through the aperture. As the excitation energy decreases, the aperture dilates so as to increase the amount of light through the aperture. The solutions proposed in this patent do not adequately address how to manufacture the proposed solution to maintain the cost effective nature of the solution in practice. Further the photochromic material can represent some difficulties with response times and other excitation issues making it a less desirable choice than electrochromic material solutions, U.S. Pat. No. 6,621,616 ("the '616 patent"), which is incorporated herein by reference, discloses certain embodiments, shown in FIGS. 14-16, providing an optical element having an electrochromic element for a camera that could be used as a shutter, variable light transmittance filter, and iris simultaneously. The '616 patent notes that by utilizing an electrochromic element as an adjustable aperture, or iris, for the carriers, the mechanical iris that is commonly used in cameras, as well as any motorized mechanism for automatically adjusting such iris, may be eliminated. This allows a camera to be made more compact and lighter since there would be less moving parts. An additional advantage of utilizing an electrochromic element as an adjustable aperture is that it allows for the depth of field of the image to be viewed to be varied in the same manner as a mechanical iris unlike an electrochromic element used as a variable transmittance filter, which changes its transmittance level uniformly across the element. The '616 patent notes that to construct an electrochromic element that may be used as an adjustable aperture, the electrochromic element should be configured to exhibit a non-uniform transmittance in response to an electrical signal applied to the electrochromic medium within the element.

U.S. Published Patent Application Serial Number 2010-0134866, which is incorporated herein by reference, teaches the broad concept of an optical element with an electrochromic, apodized aperture having variable light transmittance in response to the amplitude of an applied voltage. The apodized aperture includes (i) a first substrate having a planar inner surface and an outer surface, (ii) a second substrate having an outer surface and a non-planar inner surface opposing and spaced from the planar inner surface of the first substrate, wherein each of the planar inner surface of the first substrate and the non-planar inner surface of the second substrate has an at least partial layer of transparent conductive material there over; and (iii) an electrochromic medium disposed between the planar inner surface of the first substrate and the non-planar inner surface of the second substrate.

Additionally, of general interest includes the teachings of U.S. Pat. No. 7,158,268 which discloses a digital image scanner with a variable aperture lens wherein preferably the electronic variable aperture is provided by use of electronically controlled polarization plates or by use of electrochromic substances. U.S. Pat. Nos. 4,526,454 and 5,471,339 also provide two specific examples of electrochromic substances being used for electronic apertures for lens systems wherein in each of these cited patents, electronic diaphragms are described that are capable of having more than two selectable apertures for light transmittance. U.S. Pat. No. 6,426,492 discloses a vehicular imaging system which includes an electro-optic aperture which is operable to selectively attenuate captured light passing through at least one region of the electro-optic aperture. Additionally, U.S. Pat. Nos. 5,555,069, 5,387,958, 4,554,587, and 4,256,372 provide examples of cameras utilizing electrochromic light filters, wherein in each of these patents, the electrochromic light filter exhibits substantially uniform transmittance levels and are used in combination with the mechanical irises.

The broad electrochromic apodized aperture solutions of the prior art such as particularly disclosed in U.S. Pat. No. 6,621,616 and/or U.S. Published Patent Application Serial Number 2010-0134866 need to be implemented in a manner that is cost effective for efficient large scale manufacturing. It is an object of the present invention to develop optical elements incorporating an electrochromic apodized aperture, and aperture body designs configured to form an electrochromic apodized apertures and methods of making the same suitable for efficient, effective manufacturing.

SUMMARY OF THE INVENTION

The various embodiments and examples of the present invention as presented herein are understood to be illustrative of the present invention and not restrictive thereof and are non-limiting with respect to the scope of the invention.

The present invention provides an aperture body configured to form an electrochromic apodized aperture of an optical element. The aperture body comprises an area defining the clear aperture area; a fluid containment area substantially overlapping the clear aperture area; at least one fill passage extending from the fluid containment area; and at least one fill port at a distal end of each fill passage at a position outside of the dear aperture area.

Further, the present invention provides an optical element comprising an electrochromic anodized aperture having variable light transmittance through a clear aperture area in response to an applied electrical current. The apodized aperture comprises; (i) an aperture body including an area defining the clear aperture area, the body including a fluid containment area substantially overlapping the clear aperture area, the body including at least one fill passage extending from the fluid containment area to at least one fill port at a distal end of the fill passage at a position outside of the clear aperture area; (ii) an electrochromic fluid within the fluid containment area substantially overlapping the clear aperture area and having variable light transmittance in response to an applied electrical current; (iii) a cover attached to the body with the electrochromic fluid between the cover and the body; (iv) electrical contacts configured to be electrically coupled to the electrochromic fluid for supplying electrical current thereto; and (v) at least one passage seal in each said fill passage positioned outside of the clear aperture area.

The present invention also provides an aperture body configured to form an electrochromic anodized aperture of an optical element. The aperture body comprises an area defining the clear aperture area; and a recess substantially overlapping the clear aperture area, wherein the recess defining the fluid containment area has a depth which is generally decreasing in a direction toward the center of the recess.

Additionally the present invention provides an optical element comprising an electrochromic anodized aperture having variable light transmittance through an aperture area in response to an applied electrical current. The anodized aperture comprises: (i) an aperture body including an area defining the aperture area, the body including a fluid containment recess substantially overlapping the aperture area, wherein the recess defining the fluid containment area has a depth which is generally decreasing in a direction toward the center of the recess; (ii) an electrochromic fluid within the fluid containment area, substantially overlapping the aperture area and having variable light transmittance in response to an applied electrical current; (iii) a cover attached to the body with the electrochromic fluid between the cover and the body;

and (iv) electrical contacts configured to be electrically coupled to the electrochromic fluid for supplying electrical current thereto.

The present invention also is directed to a method of making an optical element including an electrochromic apodized aperture having variable light transmittance through a clear aperture area in response to an applied electrical current. The method comprises the steps of: (i) forming an aperture body including an area defining the aperture area, the body including a fluid containment area substantially overlapping the aperture area (ii) forming a cover for the aperture body (iii) attaching the cover to the aperture body; (iv) following the attaching of the cover to the body, filling the fluid containment area with an electrochromic fluid having variable light transmittance in response to an applied electrical current, and (v) sealing the electrochromic apodized aperture.

The invention also is directed to a method of making an optical element including an electrochromic apodized aperture having variable light transmittance through a clear aperture area in response to an applied electrical current. The method comprises the steps of: (i) pressing an aperture body including an area defining the aperture area, the body including a fluid containment recess in the body substantially overlapping the aperture area, wherein the body is pressed at a cycle time of less than 10 seconds, (ii) forming a cover for the aperture body; (iii) filling the fluid containment area with an electrochromic fluid having variable light transmittance in response to an applied electrical current, and (iv) sealing the electrochromic apodized aperture.

These and other advantages of the present invention will be clarified in the description of the preferred embodiments taken together with the attached Figures.

BRIEF DESCRIPTION OF THE DRAWINGS

FIG. 3 is a schematic section view of the optical element of FIG. 2A and B;

FIG. 4A is a schematic top plan view of an optical element including an electrochromic apodized aperture having variable light transmittance through a clear aperture area in response to an applied electrical current according to a further embodiment of the present invention;

FIG. 4B is a schematic perspective section view of the optical element of FIG. 4A;

FIG. 5A is a schematic top plan view of an optical element including an electrochromic apodized aperture having variable light transmittance through a clear aperture area in response to an applied electrical current according to a further embodiment of the present invention;

FIG. 5B is a schematic top plan view of an optical element including an electrochromic apodized aperture having variable light transmittance through a clear aperture area in response to an applied electrical current according to a further embodiment of the present invention;

FIG. 11A is a top plan view of a Gaussian apodized aperture and an associated curve of light transmittance across the aperture;

FIG. 11B is a top plan view of a flat topped Gaussian apodized aperture and an associated curve of light transmittance across the aperture;

FIG. 11C is a top plan view of a fuzzy edge flat topped Gaussian apodized aperture; and FIGS. 12A-D are cross sectional views of optical elements including an electrochromic apodized aperture having variable light transmittance through a clear aperture area in response to an applied electrical current according to one embodiment of the present invention in which the cover and or the body include a defined curvature for forming an optically powered electrochromic apodized aperture.

DETAILED DESCRIPTION OF THE INVENTION

Figure 1:
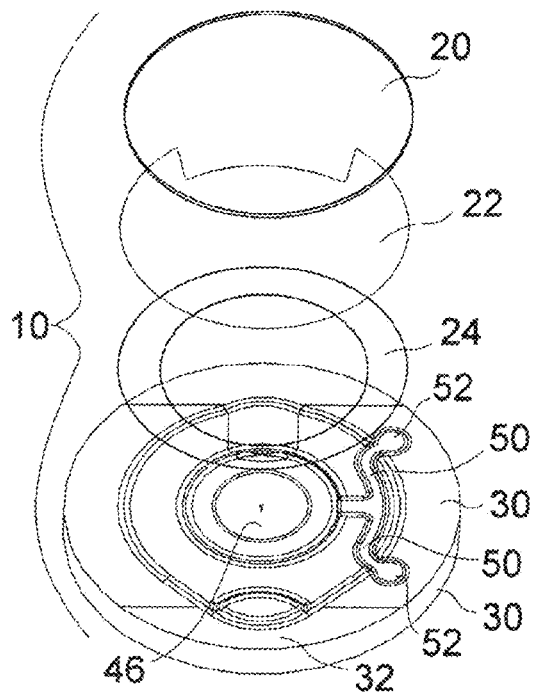
FIG. 1 is a schematic exploded view of an optical element including an electrochromic apodized aperture having variable light transmittance through a clear aperture area in response to an applied electrical current according to one embodiment of the present invention.

Other than in any operating examples, or where otherwise indicated, all numbers expressing quantities of ingredients, reaction conditions and so forth used in the specification and claims are to be understood as being modified in all instances by the term "about," Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Not withstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

As used in this specification and the appended claims, the articles "a," "an," and "the" include plural referents unless expressly and unequivocally limited to one referent.

The various embodiments and examples of the present invention as presented herein are each understood to be non-limiting with respect to the scope of the invention. The term "including" and like terms mean "including but not limited to."

As used in the following description and claims, the following terms have the meanings indicated below:

An electrochromic medium is any organic or inorganic substance that changes color or transparency with the application of electricity. Many electrochromic materials will have a degree of color change between extremes generally proportional to the amount of voltage applied to the medium, An electrochromic fluid references any electrochromic medium that is flowable during at least assembly of the associated component. This includes conventional electrochromic fluids, as well as electrochromic gels, electrochromic polymerizable materials, possibly electrochromic gasses, and even electrochromic solids such as micro-beads. Thus, within the meaning of the present application a electrochromic fluid may but need not be "flowable" in the optical device in use, as it need only be flowable at the time of assembly of the optical device.

As used herein, the term "apodized" and related terms (e.g., apodizing, apodization, etc.) refer to an aperture which has a substantially smooth and gradual transition along its radius from the greatest percentage of transmitted light (e.g., at the center point or centralized area of the aperture) to the lowest percentage of transmitted light (e.g., at the edges of the aperture). Thus the transmittance curve may have a smooth and gradual transition across the entire diameter of the optical element aperture 10 as shown in FIG. 11A discussed below, or may have a central area for the aperture 10 defining the greatest percentage of transmitted light as generally shown in FIGS. 11B and C described below which results in a truncated transmittance curve.

As noted, one example of what might be termed a fully apodized aperture would be one for which light transmittance (T) varies along its radius (x) as a Gaussian curve at least till the point of greatest percentage of transmitted light as shown in FIGS. 11A-C. When employed as an optical element, for example, as a camera iris, the electrochromic apodized aperture 10 of the present invention emulates the pupil of the human eye in that it facilitates automatic "dilation" and "constriction". As the excitation energy increases, the aperture 10 constricts so as to reduce the amount of light through the lens. The constricting aperture 10 enabled by the present invention changes (i.e., increases) the effective f-number of the lens system and therefore increases its depth of field. Similarly, as the excitation energy decreases, the aperture 10 dilates so as to increase the amount of light through the lens. As the aperture 10 becomes completely transparent the full aperture is limited only by the lens mechanical stop (assuming no other system elements serve as limiting factors). Thus, the apodized aperture 10 as shown is characterized by a Gaussian radial transmittance curve which is best illustrated in FIG. 11A. The thickness of the electrochromic fluid increases from the center along a radius of the apodized aperture 10 to the outer edge of the clear aperture area 25 and varies with the non-planar (e.g., convex) inner surface of the base. Other transmittance curve configurations, or shapes, providing substantially smooth and gradual transition along its radius across the clear aperture area 25 from the greatest percentage of transmitted light (near the center) to the lowest percentage of transmitted light (at the outer edge of the clear aperture area 25) are possible, such as Lorentzian curves. Some configurations providing an apodized aperture are "flat top" curves, also known as truncated curves, which are essentially where there is a central area of greatest percentage of transmitted light. Thus frusto-Gaussian and frusto-Lorentzian curves, also called truncated curves, could model the light transmittance across apodized aperture 10 for "flat top" such as the frusto-Gaussian configuration illustrated in FIG. 11B. In addition to a flat top structure, the apodized aperture 10 of the invention may have a "fuzzy edge" flat stop configuration to soften the "flat top" transition as suggested in FIG. 11C.

A "fuzzy edge" flat-top Gaussian aperture 10 as shown in FIG. 11C is an apodized aperture from the edge of the clear aperture area 25 to the central region according to the design of the island body shown, in one embodiment, by the concave 46 to the central apex 48 in FIG. 3. However, near the center, a laser etched circular pattern of the ITO coating (also referenced as Tin Doped Indium Oxide and commonly as Indium Tin Oxide) can provide a flat-top Gaussian, but an irregular etched pattern of the ITO coating could also provide a "fuzzy edge" flat top Gaussian as shown in FIG. 11C. For example, by laser etching a series of wedge or triangular patterns radially about the flat top region, as exemplified in FIG. 11C, the sharp or hard edge change from apodized Gaussian to the flat top can be "softened".

The clear aperture area 25 is the maximum usable optical area or path in the associated optical aperture. Currently the clear aperture area is about 0.5 mm to about 3.0 mm, although any area for the designated application could be used. This limit is practically associated with current camera sensors, however as new camera sensors become available smaller aperture areas are possible. The pupillary region is the area of light transmission through the aperture, which area will vary with and without activation of the electrochromic fluid in the aperture of the invention, and this pupillary region will generally be equivalent to the clear aperture area of the aperture of the invention.

Figure 8B:
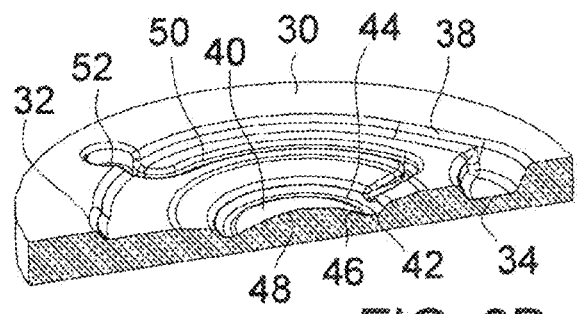
FIG. 8B is a schematic perspective section view of the optical element of FIG. 8A.
Figure 8C:
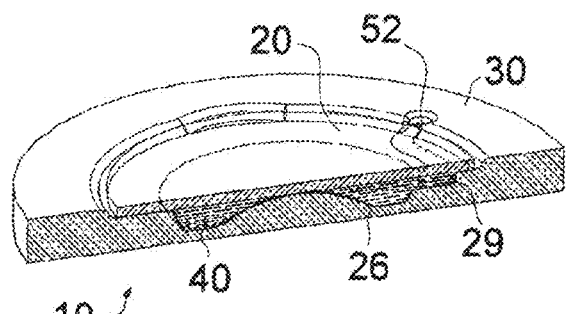
FIG. 8C is a schematic perspective section view of an optical element including an electrochromic apodized aperture having variable light transmittance through a clear aperture area in response to an applied electrical current according to a further embodiment of the present invention.

In summary as shown in FIG. 1 the present invention provides an electrochromic apodized aperture 10 which is an optical element forming an aperture using an electrochromic medium, specifically electrochromic fluid 26 (shown in FIGS. 8C and 12A-D and omitted from the remaining Figures for clarity) in a reservoir 40, wherein the light transmission from the edge of the clear aperture area 25 to the center or to the area of greatest light transmission is generally a smooth function as opposed to a step function in at least one operational state of the electrochromic medium, as shown in FIGS. 11A-C. The electrochromic apodized aperture 10 has variable light transmittance through the clear aperture area 25 in response to an applied electrical current, with the response being generally proportional to the applied voltage. The apodized aperture 10 comprises: an aperture body 30 including an area defining the clear aperture area 25, the body 30 including a fluid containment area formed by recess 40 substantially overlapping the clear aperture area 25, the body 30 including at least one fill passage 50 extending from the fluid containment recess 40 to at least one fill port 52 at a distal end of the fill passage 50 at a position outside of the aperture area 25; an electrochromic fluid 26 within the fluid containment recess 40 substantially overlapping the clear aperture area 25 and having variable light transmittance in response to an applied electrical current; a cover 20 attached to the body 30 with the electrochromic fluid 26 between the cover 20 and the body 30; electrical contacts 32 configured to be electrically coupled to the electrochromic fluid 26 for supplying electrical current thereto; and at least one passage seal 29 (shown in FIG. 8C and omitted from the remaining Figures for clarity) in each said fill passage 52 positioned outside of the clear aperture area 25.

The aperture body 30 is the structural base of the electrochromic apodized aperture 10 of the invention, generally supporting the electrochromic fluid 26 thereon. The aperture body 30 may be easily formed of any glass, such as fused silica or fused quartz, or alternatively from polymeric substrate materials. Suitable glass substrates can include but are not limited to any of those widely known (e.g., fused silica and fused quartz or others as previously mentioned) and can include those having a refractive index of 1.40 or greater, or 1.45 or greater, such as 1.50 or greater, or 1.65 or greater. In a particular embodiment of the present invention, the aperture body can comprise a glass having a refractive index of 1.35 to 1.75. Fused quartz forming the body 30 may offer some manufacturing advantages by allowing for rapid pressing of the substrate to form the body 30, improving manufacturing speeds for a given line. Suitable polymeric substrates for the body 30 also includes without limitation polycarbonate, polystyrene, polyurethane, polyurethane(urea), polyester, polyacrylate, polymethacrylate, poly(cyclic)olefin, polyepoxy, copolymers thereof, or mixtures of any of the foregoing. The polymeric substrates forming the body 30 can comprise a combination of any of the foregoing substrates, for example, in the form of a multilayer laminate. The polymeric substrates forming the body 30 can be formed by any manufacturing methods known in the art such as by casting or molding, e.g., injection molding, techniques. In a particular embodiment of the present invention the polymeric substrate forming the body 30 comprises polycarbonates, poly(cyclic)olefins, polystyrenes, polyurethanes, polymethacrylates, co-polymers of any of the foregoing materials, or mixtures of any of the foregoing.

The use of quartz may allow for rapid pressing, and much faster cycle times than with conventional pressed glass components. The small size of components of the aperture of the invention may offer less stress concerns than pressing larger glass objects because far less mass of material is being moved, wherein a variety of glass materials can also yield the rapid production found with pressing quartz. Further the invention contemplates pressing individual components as well as pressing an array of components simultaneously.

Typically, both the aperture body 30 and cover 20 of the aperture 10 are transparent (i.e., optically clear), however for some applications one or both may be tinted or otherwise colored. As used herein, by "transparent" is meant a substrate that has a luminous transmittance of at least 70 percent. The substrates forming the body 30 and cover 20 of the invention may have a luminous transmittance of at least 80 percent, or at least 85 percent. Suitable polymeric substrates can include without limitation those having a refractive index ranging from 1.30 to 1.75, such as from 1.35 to 1.70.

The aperture body 30 includes a pair of distinct layers of transparent conductive material or electrical contacts 32 there over. The conductive material 32 can be selected from any of those widely known in the field of electrochromic devices. For purposes of the present invention, the conductive material 32 typically comprises a transparent conductive material selected from ITO, carbon nano-tubes, gold, tin oxide, fluorine-doped tin oxide, aluminum zinc oxide, and/or one or more conductive polymers. Non-limiting examples of suitable conductive polymers can include poly(acetylene), poly(pyrrole), poly(thophene), poly(aniline), poly(fluorene), poly(pyridene), poly(indole), poly(carbazole), poly(azine), poly(quinone), poly(3-alkylthiophene), polytetrathiafulvalene, polynaphthalene, poly(p-phenylene sulfide), and/or poly(para-phenylene vinylene). For a detailed discussion of suitable conductive polymers, see Handbook of Conducting Polymers, $2^{nd}$ ed., rev'd., Marcel Dekker, Inc., New York 1998. In the optical element formed by aperture 10 of the present invention, the at least partial layer of transparent conductive material 32 on body 30 provides a surface conductivity ranging from 1 to 1000 ohm(s)/square, for example from 1 to 500 ohm(s)/square, such as from 1 to 100 ohm(s)/square, or 3 to 80 ohms/square, or from 5 to 50 ohms/square.

One layer of conductive material is a lead 32 extending to the fluid containing area or recess 40 holding the electrochromic fluid 26. The opposed layer or contact 32 extends from a contact receiving recess 34. The recess 34 is configured to receive a conductive material 27 (Shown in section views of FIGS. 12A-D and omitted from other Figures for clarity) intended to provide a large area of contact between contact 32 and contacts 22 on the cover 20. The use of recess 34 and contact material 27 is believed to provide a secure electrical coupling between the aligned contacts 32 and 22. The use of the contact material 27 within recess 34 may be more applicable for certain manufacturing methods. Conventional electrical coupling techniques also may be used.

Figure 2A:
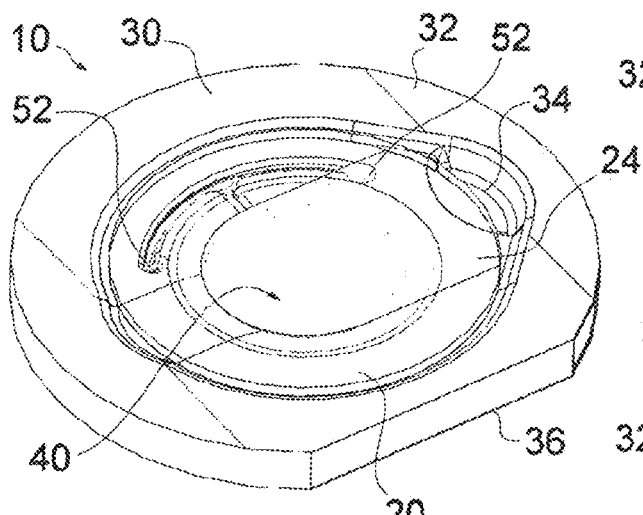
FIG. 2A is a schematic perspective view of an optical element including an electrochromic apodized aperture having variable light transmittance through a clear aperture area in response to an applied electrical current according to a further embodiment of the present invention.
Figure 2B:
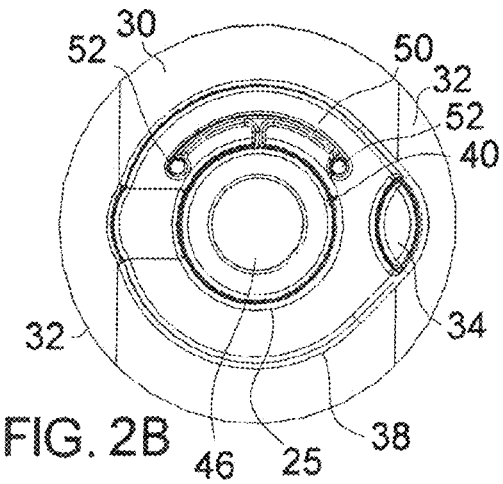
FIG. 2B is a schematic top plan view of the optical element of FIG. 2A without en element positioning feature.

The body 30 can further include alignment mechanism 36 on an outer edge thereof as shown in the example of FIG. 2A, with the mechanism 36 provided to facilitate manufacturing, by facilitating part holding and part alignment. Other shapes or devices are possible such as notches or the like to facilitate part alignment, pick up, handling, and placement with the desired orientation. Element 36 is merely representative of a variety of alignment mechanisms.

The body 30 includes a recess 38 adapted to receive the cover 20 as shown. Additionally the body 30 includes a recess 40 formed therein to provide a reservoir for the electrochromic fluid 26. The recess 40 defining the fluid containment area has a depth which is generally decreasing in a direction toward the center of the recess 40, and wherein the structure is generally symmetrical about a central axis. The recess 40 is formed by an outer shoulder 42, generally circular in plan view in the illustrated embodiments. It should be apparent the clear aperture area 25 is located within the area defined by shoulder 42. Adjacent shoulder 42 forming the recess 40 is an annular outer floor 44 and then central concave structure 46 extending to a central apex 48. The shape illustrated is a spherical shape but a straight slope, and concave/convex curves are also possible, namely most other shapes that are also symmetrical about a central axis through apex 48. Further frusto-spherical, frusto-conical and other "flat topped" configurations could form the recess 40 with the apex 48 formed by the flat top to mechanically form the flat top shape and fuzzy flat top shape of FIGS. 11B and 11C.

Further in alternative embodiments where the aperture 10 is providing power, i.e. the aperture 10 as a whole is also used as an optical lens, appropriate nonsymmetrical shapes for the surface forming recess 40 would become possible. As shown in the embodiments of FIGS. 12B and 12C the back surface of the body 30 can be shaped to form a lens structure to accommodate adding optical power to the aperture 10. This can also be referenced as forming a combined aperture/lens structure. Further, the addition of optical power to the aperture 10 can be through simple spherical changes as well as aspheric configurations for the body 30 and/or cover 20 (or through a separate lens structure) in order to reduce optical aberrations.

The cover 20 is generally formed of the same material as the body 30 and it may increase manufacturing speed to press the cover from quartz similar to the body 30, although any conventional transparent material may be suitable for forming the cover 20. The cover 20 includes transparent conductive material or electrical contacts 22 the same as material 32 discussed above in connection with body 30. The contacts 22 generally provide a lead from the electrochromic fluid 26 to the conductive material 27 in recess 34.

In a particular embodiment of the present invention, the first layer of transparent conductive material 32 on the body 30 opposes and is spaced from the layer of transparent conductive material 22 on the cover 20. The spacing distance therebetween is dependent upon a number of factors, including but not limited to the concentration of the electrochromic medium 26 and the topography of the recess 40. Taking into account such factors, the spacing distance is selected such that the coloration of the electrochromic medium 26 within the pupillary region of the apodized aperture 10 is minimized or eliminated altogether.

The body 30 and the cover 20 can be electrically isolated in the central pupillary region (generally at apex 48 of recess 40) to prevent a short circuit. An insulating material can be added to apex 48 to assure proper electrical isolation at the pupillary region or the contacts 32 and 22 properly etched to avoid material in this region with the insulating material thereby electrically forming the flat top area shown in FIG. 11B or the fuzzy edge flat top of FIG. 11C.

The fluid containment area formed by recess 40 is filled with electrochromic fluid 26 disposed between the conductive layer 32 on the body 30 and the conductive layer 22 on the cover 20. The electrochromic fluid 26 can comprise any of the electrochromic materials known in the art that is flowable at least at the time of assembly of the aperture 20, and can be in any known form (for example, in the form of a liquid, a gel, a polymeric material, flowable solid). For example, the electrochromic fluid 26 can be in the form of solvent-phase electrochromic medium. For purposes of the present invention, the terms "solvent-phase electrochromic medium" or "solution-phase electrochromic medium" are intended to include electrochromic media in the form of a liquid as well as a gel. In a particular embodiment of the present invention, the electrochromic medium comprises a solvent-phase electrochromic medium in the form of a liquid. The electrochromic medium includes at least one electrochromic compound or dye, which varies in color or darkness in response to an applied voltage. Typically, the electrochromic medium used in the optical element of the present invention includes electroactive cathodic and anodic materials. In solution-phase electrochromic media, the electrochromic compound(s)/dye(s) are contained in a solution in an ionically conducting electrolyte. The material remains in solution when electrochemically reduced or oxidized.

Generally, the solvent-phase electrochromic fluid 26 contains at least one anodic electroactive dye, at least one cathodic electroactive dye, and a small amount of salt(s) that is/are soluble in a suitable solvent. When a DC voltage is applied across the two respective transparent conductive layers (typically separated by a low K material, e.g. a gasket or seal member 24), the anodic dyes are electrochemically oxidized at the surface of the anode and the cathodic dyes are electrochemically reduced at, the surface of cathode. Color formation is accomplished when the molar extinction coefficient of the anodic dye and/or cathodic dye in the solvent-phase electrochromic fluid 26, change with their electrochemical reactions. Generally, at least one of the dyes undergoes a significant increase in extinction coefficient at a wavelength in the visible range. These colored species are free to diffuse from the electrodes (i.e., the respective transparent conductive layers) and meet each other in the bulk of the electrochromic fluid 26. A redox reaction takes place between the two electrochemically changed dyes to regenerate their respective original states (i.e., the bleached or non-colored states). The final coloration of the apodized aperture 10 is the result of equilibrium between the electrochemical reaction at the electrode surfaces (i.e., the respective surfaces of the transparent conductive layers 22 and 32) and a diffusion controlled redox reaction in the bulk of the solvent-phase electrochromic fluid 26. In such a "self erasing cell", a current at a given applied voltage is required to maintain the apodized aperture 10 in the colored state. Without the applied voltage, the cell will eventually return to its original bleached state.

Notwithstanding the foregoing, the electrochromic coloration within the electrochromic apodized aperture 10 can be enhanced by applying a progression of voltage pulses. The pulses can be applied either by pulsing voltage on and off, or by pulsing between two different applied voltages, and/or by pulsing to reverse polarity in order to reverse current flow direction. Coloration and de-coloration can be affected by adjusting (either individually or in any combination) the amplitude of applied voltage pulses (in either the positive or negative direction), the pulse time, and/or pulse frequency in addition, modifications in pulse shape as well, such as sine, square, triangle, step, etc., may be used as well as pulse modulation techniques. These would also incorporate phase modulation techniques.

Also, it is contemplated that the apodized aperture 10 can be structured to accommodate the resistive heating of the apodized aperture 10, for example, through the use of a quick burst of battery power through one or both of the transparent conductive layers 22 and 32. Heating the aperture 10 may serve to increase the kinetics of coloration of the electrochromic fluid 26 and also to increase the rate of fading back to the bleached state ("fade rate").

The electrochromic fluid 26 employed in the optical element formed by aperture 10 of the present invention can comprise any of the electrochromic compounds known in the art, including, for example, phenazine compounds, such as dihydro-phenazine compounds, and/or dipyridinium (i.e., viologen) compounds. Suitable non-limiting examples of such phenazine compounds and the preparation thereof can include those described in U.S. Pat. No. 6,020,987 at column 31, line 43, column 34, line 7, and in U.S. Pat. No. 4,902,108 at column 13, line 49 to column 15, line 42, the cited portions of which are incorporated herein by reference, Suitable non-limiting examples of viologen compounds include those described in U.S. Pat. No. 6,020,987 at column 34, line 8-55, incorporated herein by reference. See also, Electrochromism and Electrochromic Devices, Monk et al., Cambridge University Press 2007, Chapter 11, pp. 341-373, incorporated herein by reference in its entirety. Specific examples of suitable anodic electrochromic dyes can include but are not limited to 5,10-dihydro-5,10-dimethylphenazene, N,N,N,N'-tetramethyl-1,4-phenylenediamine, 10-methylphenothlazine, 10-ethylphenothiazine, tetrathiafulvalene, ferrocene and derivatives thereof, and/or triarylamines and derivatives thereof. Specific examples of suitable cathodic electrochromic dyes can include but are not limited to 1,1-diphenyl-4,4'-bipyridinium di-tetrafluoroborate, 1,1'-di(n-heptyl)-4,4'-bipyridinium di-tetrafluoroborate, 1,1'-dibenzyl-4,4'-bipyridinium di-tetrafluoroborate, and/or 1,1'-di(n-propylphenyl)-4,4'-bipyridinium di-tetrafluoroborate.

In addition, the electrochromic fluid 26 also may include other materials such as solvents (e.g., polar aprotic solvents), light absorbers, light stabilizers, thermal stabilizers, antioxidants, thickeners or viscosity modifiers (e.g., polyvinylpyrrolidone), and free standing gel, including polymer matrices. The electrochromic medium can include a solvent comprising propylene carbonate, benzonitrile, phenoxyacetonitrile, diphenyl acetonitrile, sulfolane, sulfolate, and/or phosphoramide. Other useful solvents can include, but are not limited to phosphoric esters such as tricresyl phosphate, cresyl phosphate and the like, amides such as N,N-di-methylformamide, methylpropionamide, N-methylpyrrolidone, hexamethylphosphonamide, diethylformamide, tetramethylurea and the like, nitriles such as acetonitrile, sulfoxides such as dimethylsulfoxide, esters such as ethyl acetate, butyl acetate, dioctyl phthalate and the like, carbonates such as propylene carbonate, ethylene carbonate and the like, lactones such as gamma-butyrolactone, ketones such as methyl ethyl ketone, methyl isobutyl ketone and the like. Any of the aforementioned solvents maybe used singly or in any combination. The viscosity of the solvent can influence the response speed of the electrochromic coloration. Thus, when higher response speeds are needed, solvents of lower viscosity typically are used.

Additionally, the solution-phase electrochromic fluid 26 can comprise a dissolved electrolyte, for example, tetrabutylammonium tetrafluoroborate and/or tetrabutylammonium bromide to provide ionic conductivity to the solution. Electrolyte materials suitable for this purpose are well known in the art.

In the aperture 10 of the present invention, the refractive indices of the body 30, and the electrochromic fluid 26 can be substantially the same. By "substantially the same" refractive index is meant that the difference between the respective refractive indices of each of the body 30, and the electrochromic fluid 26 is not more than +/−0.005, and in a further example not more than +/−0.004, or in a further example not more than +/−0.003, or in a further example not more than +/−0.002. Thus, the body 30 and the composition of the electrochromic fluid 26 are selected such that the respective refractive indices are substantially the same. Also, the respective refractive indices of the cover 20, and the body 30, and the electrochromic fluid 26 can be substantially the same. Such a "match" of refractive indices provides an optical element having no net optical power.

It should be noted that if the differences between the respective refractive indices are greater than those values stated above, the optics of the optical device in which the apodized aperture 10 is employed (e.g., a cell phone camera module) could be modified to adjust for this lack of refractive index matching. Simply put, in some instances it may not be desirable to "match" the refractive indices of the cover 20, fluid 26 and body 30. In such instances, the optical power of the optical element can be maintained by adjusting the various components of the optical element itself, and/or by adjusting one or more of the components of the device in which the optical element formed by aperture 10 is employed. For example, when the apodized aperture 10 is used in a cell phone camera module, the apodized aperture 10 can be used in conjunction with a camera lens having a particular power.

Likewise, optical power can be introduced in one or both of the cover 20 and body 30 of the apodized aperture 10 itself by changing the shape of the cover 20 and/or the base 30 to use the cover 20 and or base 30 as a lens as shown in embodiments of FIGS. 12A-D. The embodiments of FIGS. 12A and D curves the top of the cover 20 while the embodiments of FIGS. 12B and C curve the bottom of base 30 to illustrate various lens model possibilities. Combinations of these lens possibilities, as well as adding separate lens to the aperture 10 are all possible embodiments to add optical power to the aperture 10. Additionally the apodized aperture 10 may also be used as a lens by balancing or controlling the respective shapes and refractive indices of the cover 20 and body 30, as well as by adjusting the refractive index of the electrochromic fluid 26, e.g., by blending solvents. Optical power can be provided to an optical element of the present invention by: a) forming at least one of the aperture body and cover into a lens; b) providing electrochromic fluid with a refractive index different from the aperture body and/or cover; or c) a combination of a) and b).

In the optical element of the present invention, the electrochromic apodized aperture 10 can further comprise at least one seal member 24 about the outer perimeter of the apodized aperture 10 and in contact with the body 30 and the cover 20. The seal member 24 should be comprised of a material having good adhesion to glass and/or polymeric substrate materials of the body 30 and cover 20, and to the conductive layers 22 and 32. Also, the seal member 24 should exhibit low permeability for oxygen, moisture vapor and other gases, and should not interact with or contaminate the electrochromic fluid 26 which it may contact and partially contain (although recess 40 contains the majority of the fluid 26). Suitable materials for use as the seal member 24 include, but are not limited to thermoplastic, thermosetting and UV curing organic sealing resins such as any of those known for use in liquid crystal devices. (See U.S. Pat. Nos. 4,297,401, 4,418, 102, 4,695,490, 5,596,023, and 5,596,024.) Suitable materials for use as the perimeter seal member 24 are low K materials as mentioned above. Several non-limiting examples of suitable seal materials can include those based on epoxy, polyolefin (such as polypropylene, polyethylene, copolymers and mixtures thereof), silicones, polyesters, polyamides and/or polyurethane resins. Any of the aforementioned materials can be silane-modified to enhance the bonding thereof to the body 30 and cover 20 materials, e.g. glass. Suitable adhesives can be used were appropriate to adhere the seal member to the cover 20 and body 30. Alternatively, thermal bonding solvent fusing, or alternative fusing methodologies could replace sealing member 24 in the aperture 10.

Also, it should be noted that of one or more adhesives such as any of those known in the art, can constitute the seal member 24. Suitable adhesives for the purpose can include but are not limited to adhesives based on thermoplastic, thermosetting and UV curing organic resins. Suitable adhesives can include, for example, those based on epoxy, polyolefin (such as polypropylene, polyethylene, copolymers and mixtures thereof), silicones, polyesters, polyamides and/or polyurethane resins. The use of solder glass materials such as those described at http://www.us.schott.com/epackaging/english/glass/technical_powder/solder-.html is contemplated as well. Laser welding also could be utilized to seal the components together.

An aspect of the present invention is the provision of at least one fill passage 50 extending from the fluid containment recess 40 to at least one fill port 52 at a distal end of each fill passage 50 at a position outside of the clear aperture area 25. The fill passages 50 are channels formed in the body 30 that allow for electrochromic fluid 26 to flow into the recess 40 during assembly of the aperture 40. The channels 50 may be formed by molding, pressing, machining (e.g., laser machining, conventional mechanical machining), or chemical etching. The fill ports 52 represent the entry location of the fluid 26 during assembly. Where the fill ports 52 are overlapped by the cover 20, cover fill ports (not shown) will be formed such as by drilling, molding or the like, and will align with the fill ports 52 of the body 30 to allow for access of the fluid 26.

Additionally, the aperture 10 includes at least one passage seal 29 in each said fill passage positioned outside of the clear aperture area 25. The seal 29 can be formed of the sealants discussed above for forming the seal 24, provided the sealant is flowable at the time of assembly.

Figure 9:
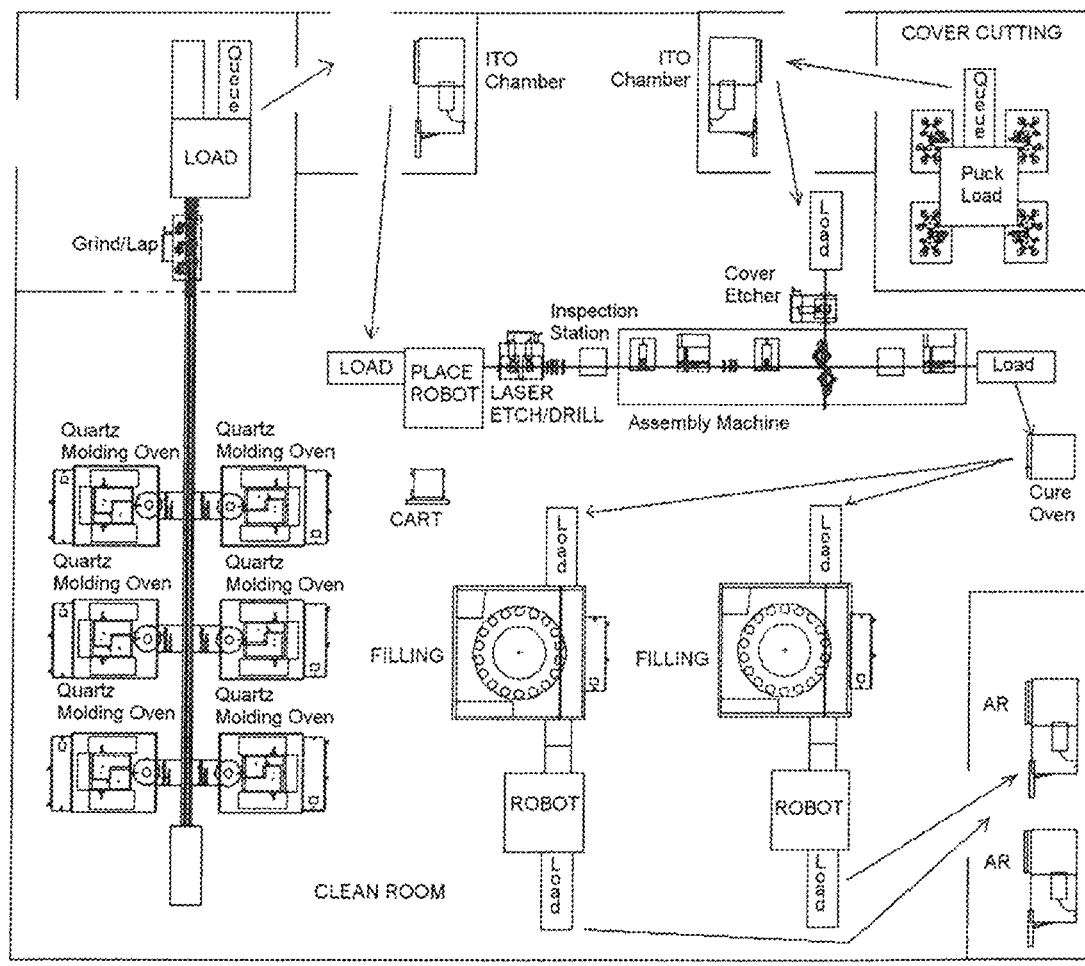
FIG. 9 is a schematic plan view of an assembly plant for assembling the optical element according to the present invention.

An exemplary floor plan for an assembly line shown schematically in FIG. 9 will illustrate one possible operation for the assembly operation of the present invention. This exemplary overview describes the proposed production line as a whole. The majority of the production equipment may be housed in a clean room to prevent particulate contamination of the parts during the various processes and transfers, with the general exception of the grinding/lapping equipment, which generally should not be included within the clean room. Alternatively, each component could be enclosed in a clean environment as opposed to a "clean room."

The first pieces of equipment in the line would be a plurality of precision molding machines used to make the body 30 pieces in a non-isothermal process. The use of quartz for forming the body 30 may be advantageous because quartz is not susceptible to many of the problems encountered with precision glass molding. However nothing in the present discussion is intended to suggest that the body 30 is limited to quartz structures for the base 30 and/or cover 20. The cycle time would be less than 10 seconds, such as less than 5 seconds or generally about 2 seconds. It is believed that an inert atmosphere is beneficial in these machines to avoid oxidation of the die surface. In general the main components of each of the molding machines can be a molding dial onto which is mounted at least one molding die, a cooling dial, molding chamber, exterior insulation/jacketing and preheat chambers. Parts can be molded in the molding chamber, indexed out on the molding dial and transferred to the cooling dial for cooling. Insulation and water jackets may surround the molding dial to reduce and control heat loss to the outside. The preheat chambers can warm the body dies to the correct temperature just prior to pressing of the bodies 30. Alternatively the die or member forming the body 30 may be heated to allow for pressing at an elevated temperature. The entire volume inside the insulation may be purged with nitrogen to prevent oxidation of the dies and other components. The nitrogen usage would be minimized while still maintaining a clean, oxygen free atmosphere. The molding chamber may have a several small view ports in the walls for viewing the process with a thermal imaging camera.

These molding machines may feed the molded bodies 30 into a grinding, polishing and washing conveyor which will lap the back surface of the bodies 30 to an optical quality finish The molding process may not require subsequent polishing and grinding, however such a station if available can be selectively used to extend the useful life of the mold. These pads would be loaded, for example, into trays and loaded into a PVD (Physical Vapor Deposition) coating chamber to have a layer of ITO (32) deposited on them. The parts may further include an anti-reflection (AR) coating (not shown) on an exterior surface thereof as AR coatings are known to vastly improve the efficiency of the optic by increasing transmission, enhancing contrast and eliminating ghost images. Conventional AR coatings may be utilized as these are also very durable, with resistance to both physical and environmental damage. After coating, the parts would be taken to an automated conveyor for further process steps. The first station on the conveyor can be a dual laser station which would laser drill fill ports 52 into the bodies 30 and laser etch a portion of the ITO coating 32. The bodies 30 would then continue down the conveyor to an assembly machine where they would be joined to the covers 20.

The covers 20 may feed in from a separate section of the line where they may be cut from quartz cane, coated with ITO (22), and laser etched similarly to the bodies 32. Again, quartz is one of many alternative materials for forming the covers 20. Further one side of the cover 20 may be provided with a conventional AR coating to improve the efficiency of the optic by increasing transmission, enhancing contrast and eliminating ghost images. Once the bodies 30 and covers 20 are assembled to form the framework for the iris assemblies they would be loaded into a curing station which may be a batch curing oven. Alternatively, if a suitable UV cured adhesive is used, a curing oven would not be needed and the curing station would be merely appropriate UV lighting along the conveyor for a designated period of time. Once the adhesive has been cured, the assemblies would be loaded into a machine that would fill them with electrochromic liquid 26 and seal the fill ports 52 with the sealant 29. The filled and sealed iris assemblies 10 would then be loaded into another PVD chamber and coated with an anti-reflective (AR) coating, if the parts are not earlier treated. This is the final stage of the proposed production line. Process steps, that are not included in this illustrated production line of FIG. 9 are, for example, packaging, gold plating, attaching any type of electrical leads to the iris assemblies 10, and providing features for attaching the assemblies 10 to cameras or cell phones.

Figure 10:
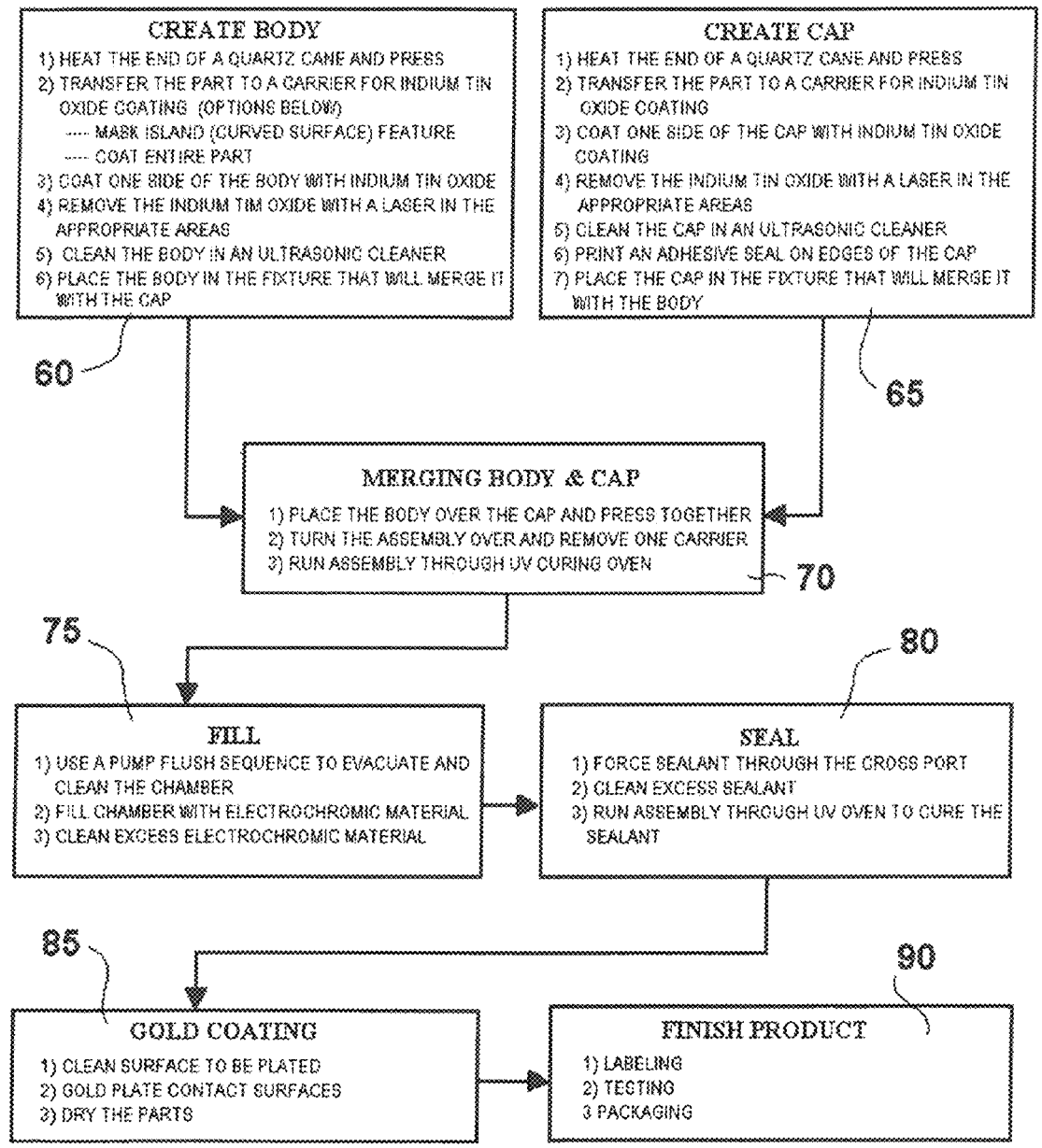
FIG. 10 is a flow chart schematically illustrating the assembly steps for assembling the optical element according to the present invention.

FIG. 10 illustrates a flow chart of the assembly process for clarification. The process starts with formation of the body 30 which begins with heating and pressing of the body from appropriate material such as quartz cane followed by polishing and finishing. The ITO or other material forming contacts 32 are applied to the body 30 either through a mask or over the entire surface followed by selective coating removal. The body 30 and contacts 32 are cleaned and moved to where the body is attached to the cover 20.

The cover 20 undergoes a similar process to the body namely that formation of the cover 20 begins with heating and pressing of the cover 20 from any appropriate material such as quartz cane followed by polishing and finishing. The ITO or other material forming contacts 22 are applied to the cover 20 either through a mask or over the entire surface followed by selective coating removal. The cover 20 and contacts 22 are cleaned and a seal member 24 is attached and the cover 20, contacts 22 and member 24 are moved to where the body 30 is attached to the cover 20.

The body 30 and cover 20 are pressed together and sent to a curing station, such as a curing oven or UV curing source, to couple the elements together. Alternatively laser welding, ultrasonic welding or other similar attaching techniques could be used to couple the body 30 and the cover 20.

The fill ports 52 and channels 50 are used to first clean the recess 40 and then fill the recess 40 with electrochromic fluid 26. Vacuum filling is the preferred method of filling the recess 40. Following the filling of the recess 40 the channels 50 are sealed with a sealing member 29 to close of the recess 40. The unit is then cured to cure the added sealant. The fill ports 52 in the body 30 and/or the fill ports in the cover 20 may also be sealed by laser welding as a possible sealing technique.

Following curing of the sealing members 29 in the channels 50 contacts coupled to contacts 32 are added and the product is dried, labeled, tested and packaged.

The above described process is essentially the same for all the embodiments disclosed in FIGS. 1-8 however the alternative embodiments present select advantages.

Initially turning to FIGS. 1 and 4A and B, these embodiments illustrate a tortuous path channel 50 having a pair of fill ports 52 at the distal end thereof. The use of a pair of fill ports 52 allows for the cleaning solution to "pass through" in one fill port and out of the other and can possibly facilitate the movement of the channel sealing member 29 there through. The arcuate/circuitous path of the channel 50 allows an extended length for sufficient sealing member material 29 to adequately seal the channels 50. Further the provision of the fill ports 52 and channel 50 outside of the clear aperture area 25 prevents the sealing members 29 from interfering with the optical qualities of the aperture 10. The fill ports 52 are shown extending beyond the cover 52 so that cover fill ports are not required.

FIG. 2A illustrates a positioning mechanism 36 discussed above and FIGS. 2A and B further disclose embodiments of the invention that use fill ports 52 in the body 30 that align with fill ports formed in the cover 20. Again the fill ports 52 (and cover fill ports) are outside of the clear aperture area 25 as is the channel 50.

FIG. 5A illustrates an embodiment in which the radial extending channel 50 extends to a single enlarged fill port 52 extending beyond the cover 20. FIG. 5B illustrates an embodiment in which the radial extending channel 50 extends to a single fill port 52 extending to a peripheral edge of the body 20 to allow for radial filling.

Figure 6A:
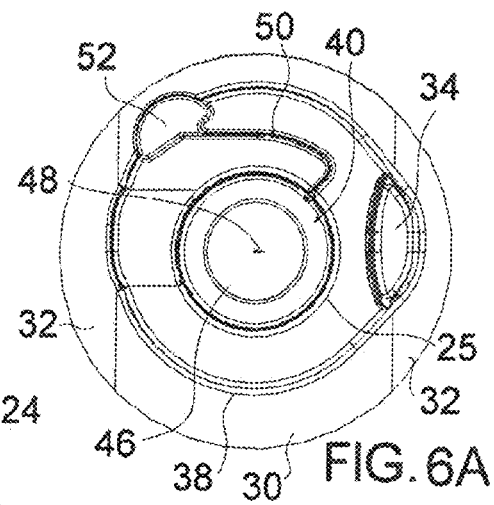
FIG. 6A is a schematic top plan view of an optical element including an electrochromic apodized aperture having variable light transmittance through a clear aperture area in response to an applied electrical current according to a further embodiment of the present invention.

FIG. 6A illustrates an embodiment in which the channel 50 extends to a single enlarged fill port 52 extending beyond the cover 20 similar to FIG. 5A except the channel 52 follows a circuitous path to provide for an extended length.

Figure 6B:
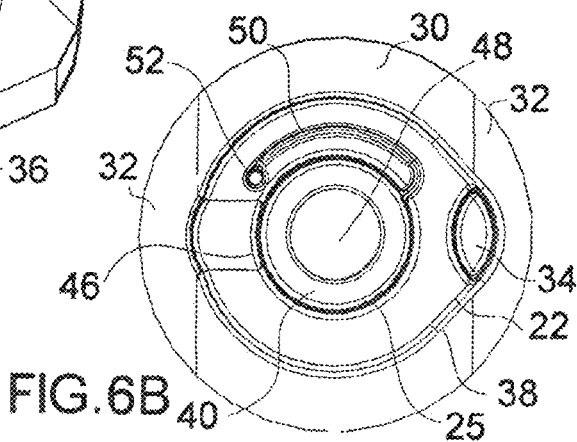
FIG. 6B is a schematic top plan view of an optical element including an electrochromic apodized aperture having variable light transmittance through a clear aperture area in response to an applied electrical current according to a further embodiment of the present invention.

FIG. 6B illustrates an embodiment in which the channel 50 extends to a fill port 52 aligned with a cover fill port provided in the cover 20 with the channel 52 following a circuitous or arcuate path to provide for an extended length.

Figure 7A:
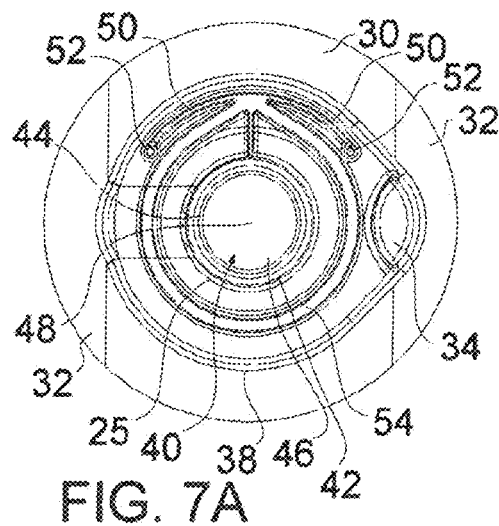
FIG. 7A is a schematic top plan view of an optical element including an electrochromic apodized aperture having variable light transmittance through a clear aperture area in response to an applied electrical current according to a further embodiment of the present invention.
Figure 7B:
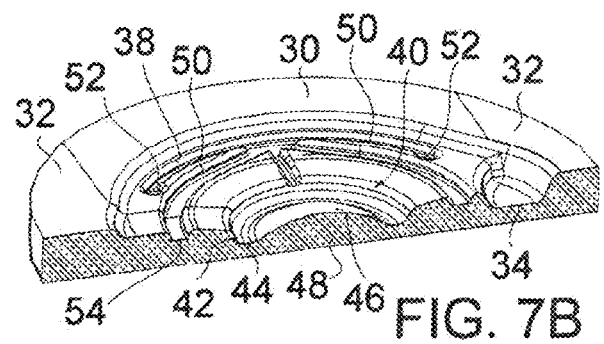
FIG. 7B is a schematic perspective section view of the optical element of FIG. 7A.

FIGS. 7A and B illustrates an embodiment in which the channel 50 extends to a circular sealing member recess 54 and end in a pair of fill ports 52 aligned with cover fill ports provided in the cover 20. This embodiment locates the sealing member 24 more precisely relative to the body 20.

Figure 8A:
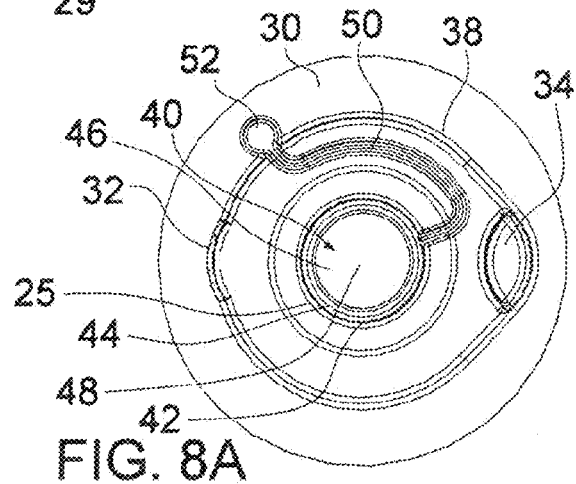
FIG. 8A is a schematic top plan view of an optical element including an electrochromic apodized aperture having variable light transmittance through a clear aperture area in response to an applied electrical current according to a further embodiment of the present invention.

FIGS. 8A and B illustrates an embodiment in which the channel 50 extends to a single fill port 52 beyond the cover 20 with the channel 52 following a circuitous or arcuate path to provide for an extended length.

Whereas particular embodiments of the invention have been described above for purposes of illustration, it will be evident to those skilled in the art that numerous variations of the details of the present invention may be made without departing from the spirit and scope of the present invention.

We claim:

1. A method of making an optical element including an electrochromic apodized aperture having variable light transmittance through an aperture area in response to an applied electrical current, the method comprising the steps of:
    i. forming an aperture body including an area defining the aperture area, the body including a fluid containment area overlapping the aperture area, a fill port outside the aperture area and a fill passage extending from the fill port to the fluid containment area outside of the a aperture area wherein the fill passage is circuitous between the fill port and the fluid containment area;
    ii. forming a cover for the aperture body;
    iii. attaching the cover to the aperture body;
    iv. following the attaching of the cover to the body, vacuum filling the fluid containment area with an electrochromic fluid having variable light transmittance in response to an applied electrical current by placing the electrochromic fluid into the fill port, followed by sealing the fill passage with a sealant.

2. The method of making an optical element of claim 1, wherein the forming of the aperture body includes forming the body from quartz.

3. The method of making an optical element of claim 2, wherein the quartz body is pressed.

4. The method of making an optical element of claim 2, wherein the quartz body is pressed at a temperature above 1500° C.

5. The method of making an optical element of claim 2, wherein the quartz body is pressed at a cycle time of less than 10 seconds.

6. The method of making an optical element of claim 1, wherein the body is pressed to form a recess defining the fluid containment area and which has a depth which is generally decreasing in a direction toward the center of the recess.

7. The method of making an optical element of claim 1, wherein the body is pressed to form the fill passage.

8. The method of making an optical element of claim 1, wherein the forming of the aperture body and the cover includes forming electrically conductive coatings selectively thereon configured to extend to the electrochromic fluid in the optical element.

9. A method of making an optical element including an electrochromic apodized aperture having variable light transmittance through an aperture area in response to an applied electrical current, the method comprising the steps of:
    i. pressing a quartz aperture body including an area defining the aperture area, the body including a fluid containment area in the body overlapping the aperture area, wherein the body is pressed at a cycle time of less than 10 seconds;
    ii. forming in the body a fill port outside the aperture area and a fill passage extending from the fill port to the fluid containment area either during the pressing or by chemical or laser etching and/or drilling after the pressing;
    iii. forming a cover for the aperture body and affixing the cover to the aperture body; and
    iv. filling the fluid containment area through the fill port with an electrochromic fluid having variable light transmittance in response to an applied electrical current, and sealing the fill passage.

10. The method of making an optical element of claim 1, wherein the forming of the aperture body and the cover further includes forming electrically conductive coatings selectively on the aperture body and the cover, configured to extend to the electrochromic fluid in the optical element.

11. The method of making an optical element of claim 1, further including the step of covering at least one surface of the body or cover with an anti reflective coating.

12. The method of making an optical element of claim 1, wherein the electrochromic fluid has a refractive index different from the aperture body and/or cover.

13. The method of claim 1, the body further comprising a second port and a channel extending from the second port to the fill passage, forming a cross port.

14. The method of claim 13, wherein the sealant is forced through the cross port.

15. The method of claim 1, wherein the cover is formed into a lens.

16. The method of claim 1, wherein the aperture body is formed into a lens in which a side of the body opposite the fluid containment area is formed into a curve.

17. The method of claim 1, in which the cover and the base have different refractive indices.

* * * * *